July 5, 1966  N. C. RICE ET AL  3,259,176
ENVIRONMENTAL CONTROL SYSTEM
Filed July 9, 1963  2 Sheets-Sheet 1

INVENTORS
FRANK R. BIANCARDI
WILLIAM R. DAVISON
NED C. RICE
BY
ATTORNEY

INVENTORS
FRANK R. BIANCARDI
WILLIAM R. DAVISON
NED C. RICE
BY
ATTORNEY

United States Patent Office 3,259,176
Patented July 5, 1966

3,259,176
ENVIRONMENTAL CONTROL SYSTEM
Ned C. Rice, East Hartford, William R. Davison, Wapping, and Frank R. Biancardi, Vernon, Conn., assignors to United Aircraft Corporation, East Hartford, Conn., a corporation of Delaware
Filed July 9, 1963, Ser. No. 293,638
13 Claims. (Cl. 165—26)

This invention relates to environmental control systems and more particularly to air conditioning systems for either cooling or heating homes or industrial buildings.

Present day environmental systems and particularly air conditioning cooling systems are all-electric units or are gas-operated. Electrical units are not entirely satisfactory from an economic viewpoint in areas where the electrical power is high in cost and other forms of energy may be much cheaper. An example of this is the gas-rich South and Southwest regions of this country.

The majority of the current gas-operated air conditioners are of the absorption type. Such units are relatively expensive to purchase, particularly in sizes suitable for residential application, and are costly to operate and maintain partly due to the corrosive qualities of the working fluids. In addition, for most air conditioning systems used today, separate heating plants are necessary for cold weather in order to control the environment.

It is therefore a primary object of this invention to provide an environmental control system for cooling and/or heating which relies primarily on heat addition to the cycle.

It is a further object of this invention to provide an environmental control system which can be switched over from summer to winter operation including a control arrangement which is not only simple and efficient but also economical in initial investment cost.

Another object of this invention is to provide a hermetically sealed heat addition cycle which uses a single working fluid.

Figure 1:
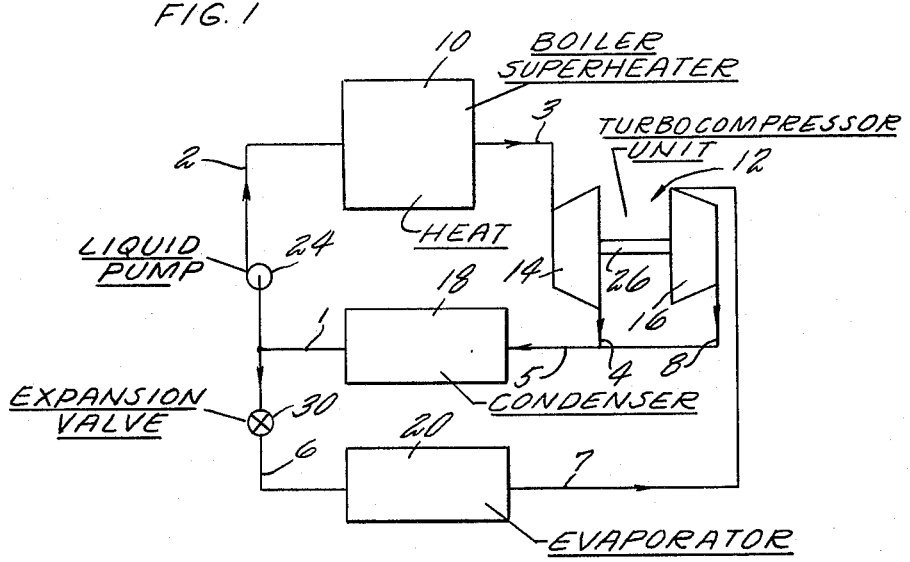
Figure 2:
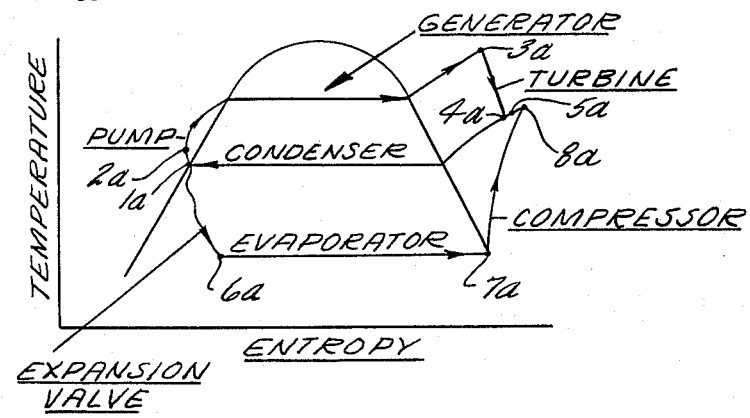

These and other objects will become readily apparent from the following detailed description of the drawings in which:

FIG. 1 is a schematic illustration of the basic thermodynamic cooling cycle;
FIG. 2 is a graphic illustration of the temperature-entropy relation of the FIG. 1 cycle; and
FIG. 3 is a schematic illustration of the environmental control system of this invention including the automatic controls therefor.

As seen in FIG. 1, the main system elements are the boiler-superheater or vapor generator 10 which element may also be referred to as a generator. The other basic elements are the turbocompressor unit generally indicated at 12 comprising a turbine unit 14 and a compressor unit 16 connected to each other by a power shaft 26. A condenser 18 and an evaporator 20 are also used in the system. The condenser 18 will contain the working fluid in a gaseous-liquid state at approximately 125° and the working fluid may comprise for example a fluorocarbon refrigerant. The working fluid is in the liquid state at station 1 which is the exit from the condenser and is pumped to a higher pressure and slightly higher temperature by an electric-powdered pump 24. In this respect reference may also be made to the working fluid state 1a shown in FIG. 2. It should be noted that the sub-lettered numerical state designations in FIG. 2 corresond to the numerical station designations in the system diagram of FIG. 1. Heat is added to the liquid in boiler or generator 10 so that the liquid is vaporized. Its condition at station 3 is represented on the temperature-entropy chart (FIG. 2) at 3a. The working fluid will have gone from a compressed liquid state to a saturated or slightly superheated vapor state in the boiler. The working fluid which will be at a temperature of about 300° F. at station 3 is expanded through the turbine 14 whereby its temperature is lowered to approximately 180° F. The turbine output power is used to drive the compressor 16 via shaft 26. At station 5 the turbine exhaust fluid from station 4 has mingled with the exhaust coming from the compressor at station 8 so that the temperature of the flow at station 5 is between the levels at stations 4 and 8 (see 4a, 5a and 8a in FIG. 2). Through the condenser the working fluid is condensed from a vapor to a liquid and there is a decrease in the entropy of the working fluid at a substantially constant temperature of approximately 125° F. A portion of the liquid flow out of the condenser flows directly through the expansion valve 30 which drops the temperature to about 40° F. at station 6 (see 6a in FIG. 2). Through the evaporator 20 the working fluid is vaporized at a substantially constant temperature of 40° F. causing a considerable increase in entropy to the station 7 (see 7a in FIG. 2). Cooling of an environment is accomplished by the heat absorption at the evaporator. There is considerable increase in temperature and pressure again through the compressor 16.

Figure 3:
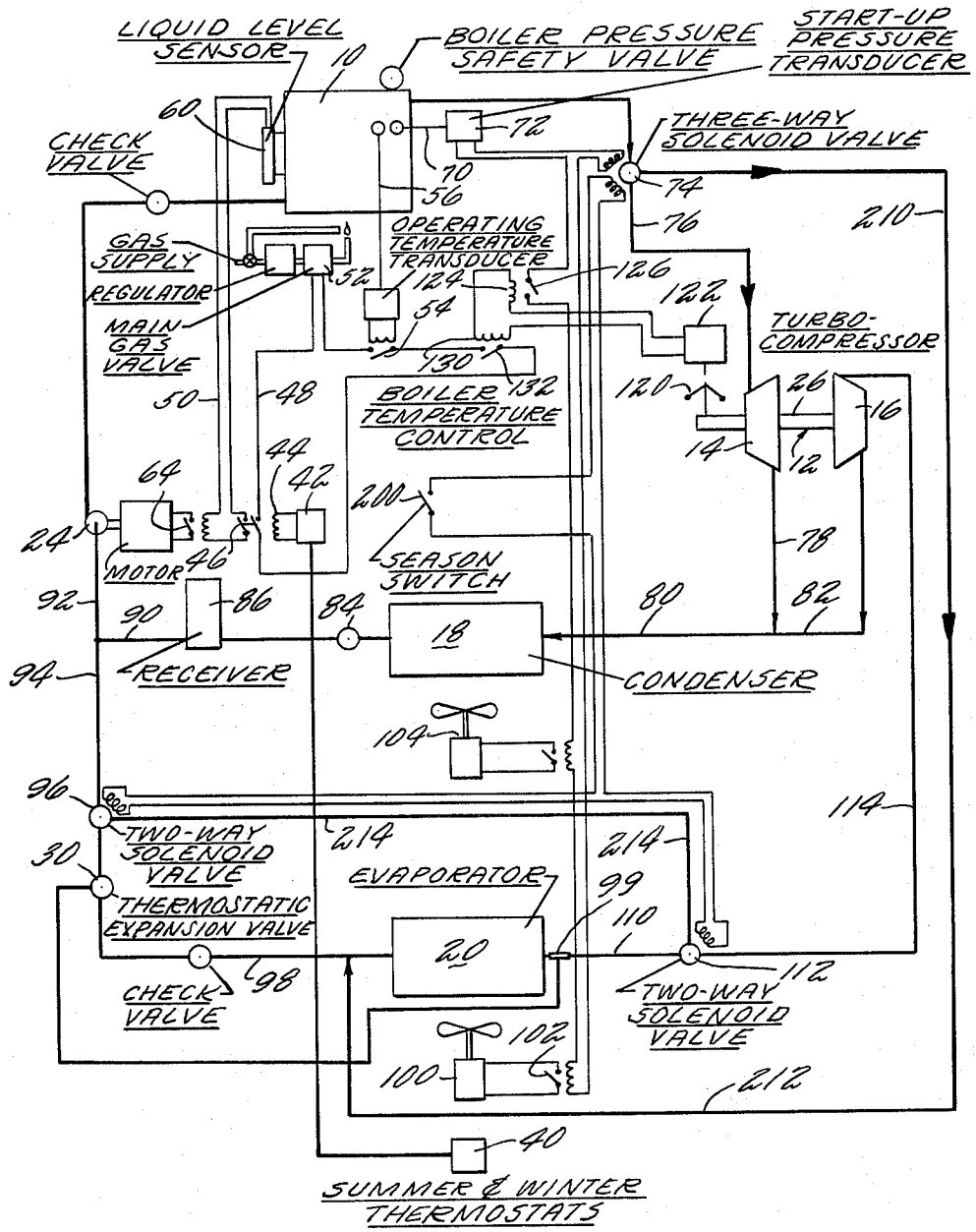

FIG. 3 illustrates in more detail the system according to this invention since what has been illustrated in FIGS. 1 and 2 generally is known in the art.

The major components of FIG. 3 are identically identified in relation to the major elements of FIG. 1. The cycle will be described first when it is operated as an air cooler or commonly defined as an air conditioner. Normally the thermostat 40 at the bottom of FIG. 3 would close the circuit therein when the temperature of the controlled environment rises above a set value. This energizes the circuitry in the relay unit 42 which would also energize the coil 44. This closes the double throw switch 46 so as to complete both the circuit 48 and the circuit 50. The circuit 48 then opens the main gas valve 52. The switch 54 is normally closed when the temperature of the boiler as sensed through the line 56 is below its maximum permissive limit. Thus, the entire circuit 42 under these conditions causes the main gas valve to open and heat to be added to the boiler. The liquid level sensor 60 will close a circuit 50 when the level is too low, which in turn will close the switch 64. This action starts the electric-powered liquid pump 24 which maintains the boiler with the proper level of working fluid, since the electric motor is shut off by the liquid level sensor when this level exceeds the set level.

When the pressure in the boiler rises sufficiently due to heat addition and vaporization of the working fluid, the pressure sensing line 70 will energize the transducer unit 72 to open the solenoid valve 74 permitting vaporized working fluid to pass through the line 76 to the turbine 14 (under these conditions flow to line 210 is cut off). It should be noted that the solenoid valve 74 may be a single valve or may be replaced by a single shutoff valve plus a selector valve. The cycle thereafter is somewhat similar to the FIG. 1 cycle. In any event, the turbine power output obtained as the working fluid is expanded therethrough is used to drive the compressor 16. The working fluid exhausting from the turbine passes through 78, whereas the flow which is coming from the compressor exhausts through the line 82. The gaseous fluid is condensed to liquid state in the condenser 18 and then passes through the check valve 84 into the receiver 86.

The receiver 86 on the downstream side of the check valve 84 is intended to collect the working fluid and provide a means for maintaining liquid at all times at the pump inlet. The receiver will also provide a chamber in which loading and/or charging of working fluid into the system can be accomplished.

The exit flow from the condenser and the receiver passes through line 90 before dividing through lines 92 and 94. The line 92 supplies the pump 24 while the line 94 supplies the thermostatic expansion valve 30 through the two-way solenoid valve 96. The working fluid in passing through the expansion valve is cooled considerably and is subsequently fed via the line 98 to the evaporator 20. The temperature sensor 99 senses the characteristics of the working fluid at the outlet of the evaporator and accordingly controls the opening of the expansion valve 30 admitting more or less working fluid to the evaporator 20. The expansion valve and sensor may be a type 402 Thermo (R) Expansion Valve, manufactured and sold by Alco Valve Co., St. Louis, Missouri. The air to be cooled is forced over the evaporator heat exchanger surface by the fan 100. The fan 100 is started by a switch 102 which is simultaneously energized when the start up pressure unit 72 is energized. This is likewise true for the condenser fan 104.

The flow from the evaporator then passes through the line 110 to the two-way solenoid valve 112 and thence to the line 114 to the compressor 16.

An overspeed device is provided for the turbine as a safety measure. To this end a flyweight is schematically illustrated at 120 and normally energizes a unit 122 which via the coil 124 will operate switch 126 to close the solenoid valve 74 and shut down the system. At the same time coil 130 will open switch 132 shutting off the main gas valve 152.

Control of boiler operating temperature (or pressure) is provided by the temperature sensing line 56 which opens or closes the switch 54, thereby turning the main gas valve on or off to control the boiler working fluid temperature within set limits.

This environmental control system may also be operated as a heating unit in the winter months by closing the season switch 200 located convenient to or integral with the summer/winter thermostat schematically shown in the center of FIG. 3. The thermostat 40 may be a double scale unit or may be two separate seasonal units which would be alternately placed into operation.

By closing the season switch each of the solenoid valves 74, 112 and 96 will direct flow into different lines than those used during operation as an air conditioner. The heated working fluid coming from the boiler will then pass through the valve 74 directly into the line 210 and 212 and to the line 98 which is the inlet line for the evaporator 20. Therefore, the turbocompressor unit 12 and the condenser 18 will be bypassed and shut down during the winter heating season. The heated working fluid then passes into the evaporator 20 so that the air passing therethrough is heated. The flow thereafter is into the line 110 and through valve 112 and into line 214. The flow is then through the valve 96 and eventually to the electric-powered liquid pump 24 and back to the boiler. The usual safety devices with the exception of the turbine overspeed control would be in the heating system also.

Although not shown in the drawing, it will be apparent that the operation of the season switch 200 could readily interrupt the circuit of the fan 104 since working fluid will not be flowing through condenser 18.

As a result of this invention, it should be apparent that a substantially simple and very reliable environmental control system has been provided. Although gas-operated air conditioners, for example, are on the market, they have been found to be not only expensive in initial investment but also expensive to maintain over a period of time. The absorption systems, as stated previously, are subject to corrosive action of their working fluids, thus maintenance and replacement costs are expensive.

As a result of this system and control arrangement, compactness, efficiency and convertability are provided. One unit can provide cooling in the summer and heat in the winter.

Although only one embodiment of this invention has been illustrated and described herein, it will be apparent that variations in the arrangement of the various parts will be had without departing from the scope of this novel concept.

We claim:

1. A convertible heating-cooling system utilizing heat energy as a source, an energy receiving generator comprising a supply of a single working liquid which becomes a working gas at elevated temperature, a turbine receiving working gases from said generator, a condenser receiving the exhaust working gases from said turbine, means for liquefying said working gas in said condenser, a pump connected to said condenser and receiving a part of the working liquid therefrom for circulating said liquid back to said generator, an expansion valve receiving another part of the working liquid from said condenser, an evaporator receiving the expanded working fluid from said valve, said condenser including heat exchange means for exchanging energy, a compressor on the outlet side of said evaporator for compressing the working fluid received therefrom, means for conducting fluid from said compressor to said condenser, and valve means in the system whereby the flow of working fluid passes from said generator and flows only to said evaporator and said pump thereby making said turbine, compressor and condenser ineffective.

2. A system according to claim 1 wherein said valve means is located on the downstream side of said generator and connected to the upstream side of said evaporator.

3. A system according to claim 1 wherein said valve means includes a first valve between said generator and said turbine, a second valve between said evaporator and said compressor, and a fluid connection between said first and second valves.

4. A system according to claim 3 wherein said valve means further includes a third valve between said evaporator and said pump, and a direct fluid connection between said second and third valves.

5. A system according to claim 4 including means for simultaneously switching said valves.

6. A convertible heating-cooling system, a source of heat, a generator receiving heat from said source including a supply of a single working liquid which becomes gaseous at elevated temperature, a turbine receiving gases from said generator, a condenser receiving the exhaust gases from said turbine, means for liquefying said gas in said condenser, a pump connected to said condenser receiving a part of the liquid therefrom for circulating said liquid back to said generator, an expansion valve receiving another part of the liquid from said condenser, an evaporator receiving the expanded fluid from said valve, said condenser including heat exchange means for absorbing energy, a compressor on the outlet side of said evaporator for compressing the fluid received therefrom, means for conducting fluid from said compressor to said condenser, and valve means in the system whereby the flow of working fluid passes from said generator and directly to said evaporator and said pump thereby making said turbine, compressor and condenser ineffective.

7. A system according to claim 6 wherein said turbine has a drive shaft connection to said compressor.

8. An environmental control system for cooling and heating, comprising a generator containing a single working fluid in liquid form, means for adding heat to the liquid to gasify said liquid, a turbine, means for conducting said gas through said turbine, a compressor driven by said turbine, a condenser for receiving the exhaust working fluid from said turbine and compressor, a pump and an expansion valve receiving flow of working fluid from the outlet of said condenser, said pump discharging into said generator, an evaporator receiving the discharge of said valve, means for bypassing the working fluid around said turbine and to said evaporator, a means for varying the opening of said valve in response to the temperature characteristics of the working fluid discharged from said evaporator, fan means for passing environmental air through said evaporator, and means responsive to the pressure in said generator for regulating said fan means.

9. An environmental control system for cooling and heating, comprising a generator containing a single working fluid in liquid form, means for adding heat to the liquid to gasify said liquid including heat supply means, a turbine, means for conducting said gas through said turbine, a compressor driven by said turbine, a condenser for receiving the exhaust from said turbine and compressor, a pump and an expansion valve receiving flow from the outlet of said condenser, said pump discharging into said generator, an evaporator receiving the discharge of said valve, means for varying the opening of said valve in response to the temperature characteristics of the working fluid discharged from said evaporator, means responsive to the liquid level in said generator for controlling said pump, means responsive to the temperature of the environment to be controlled for arming said pump controlling means and said heat supply means, means responsive to temperature of said generator and the speed of said turbine for limiting said heat supply means.

10. A system according to claim 9 including means responsive to the pressure in said generator for regulating the flow of working fluid from said generator to said turbine.

11. A system according to claim 9 including circulating means for moving environmental fluid through said condenser and said evaporator, and means responsive to the pressure in said generator for controlling said circulating means.

12. An environmental control system comprising a generator containing a single working fluid in liquid form, heating means for adding heat to the liquid to gasify said liquid, a turbine, means for conducting said gas through said turbine, a compressor driven by said turbine, a condenser for receiving the exhaust from said turbine and compressor, a pump and an expansion valve receiving flow from the outlet of said condenser, said pump discharging into said generator, an evaporator receiving the discharge of said valve, the environment to be controlled being in heat exchange relation with said evaporator, and a means for varying the opening of said valve in response to the temperature characteristics of the working fluid discharged from said evaporator, means responsive to the speed of said turbine for modifying the heat added by said heating means, means responsive to the liquid level in said generator for regulating said pump, a valve between said generator and said turbine, and means responsive to the pressure in said generator for activating said valve and said speed responsive means.

13. A control according to claim 12 including means responsive to the temperature in said generator for regulating said heat adding means.

References Cited by the Examiner

UNITED STATES PATENTS

| | | | |
|---|---|---|---|
| 2,042,838 | 6/1936 | Gibson | 122—451 |
| 2,155,516 | 4/1939 | Tull et al. | 62—225 |
| 2,200,471 | 5/1940 | Dickey | 122—448 |
| 2,875,589 | 3/1959 | Horn | 62—467 |
| 2,952,138 | 9/1960 | Russell et al. | 165—61 |
| 3,153,442 | 10/1964 | Silvern | 165—50 |

ROBERT A. O'LEARY, *Primary Examiner.*

CHARLES SUKALO, *Examiner.*